United States Patent [19]

Tanabe et al.

[11] 4,049,345

[45] Sept. 20, 1977

[54] APPARATUS FOR EXPOSING A PHOTOSENSITIVE BELTLIKE MATERIAL

[75] Inventors: Osamu Tanabe, Hikone; Hisao Nishizawa, Shiga; Kazuo Hata, Kameoka, all of Japan

[73] Assignee: Dainippon Screen Seizo Kabushiki-Kaisha, Kyoto, Japan

[21] Appl. No.: 672,383

[22] Filed: Mar. 31, 1976

[30] Foreign Application Priority Data

Apr. 3, 1975 Japan .................. 50-39798

[51] Int. Cl.$^2$ .............. G03B 27/52; G03B 27/32
[52] U.S. Cl. ........................... 355/41; 355/64
[58] Field of Search ........................ 355/40–42, 355/18, 77, 53, 63, 64

[56] References Cited

U.S. PATENT DOCUMENTS

| | | | |
|---|---|---|---|
| 3,113,498 | 12/1963 | Kallenberg | 355/64 |
| 3,148,585 | 9/1964 | Armstrong et al. | 355/18 X |
| 3,165,024 | 1/1965 | McClure | 355/18 |
| 3,369,449 | 2/1968 | Klauss et al. | 355/18 |
| 3,617,125 | 11/1971 | Sobottke et al. | 355/53 X |
| 3,689,149 | 9/1972 | Livingood | 355/64 X |
| 3,883,243 | 5/1975 | Weisglass et al. | 355/77 X |
| 3,900,257 | 8/1975 | Woolley et al. | 355/53 X |

*Primary Examiner*—Donald A. Griffin
*Attorney, Agent, or Firm*—Cantor & Singer

[57] ABSTRACT

Apparatus for exposing an image of a desired pattern, such as a lead frame pattern for producing lead frames of IC devices, with a predetermined pitch on a photosensitive beltlike material consisting of a film carrier and a photoresist-coated metallic foil laminated on the carrier.

Apparatus typically comprises a first means for positively supporting and accurately positioning the beltlike material at an exposing position, a second means for intermittently conveying the material and a third means for photoelectrically detecting the amount of the movement of the beltlike material to control the first and the second means.

5 Claims, 7 Drawing Figures

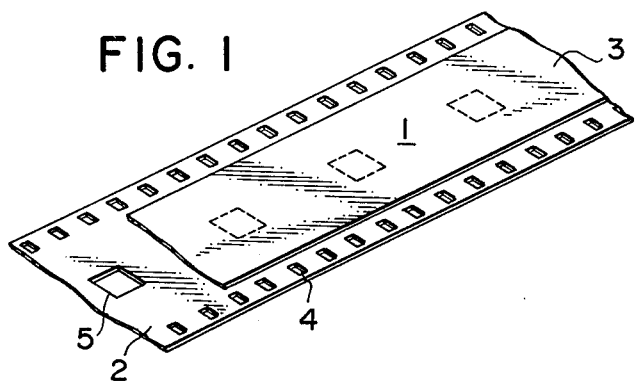
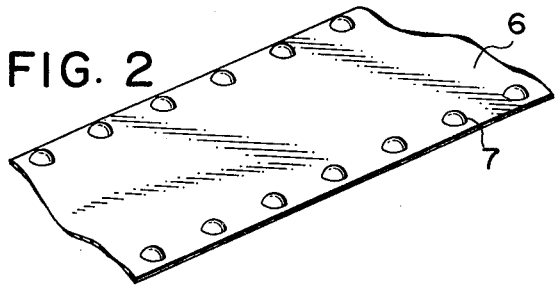
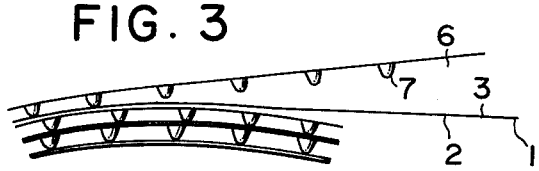
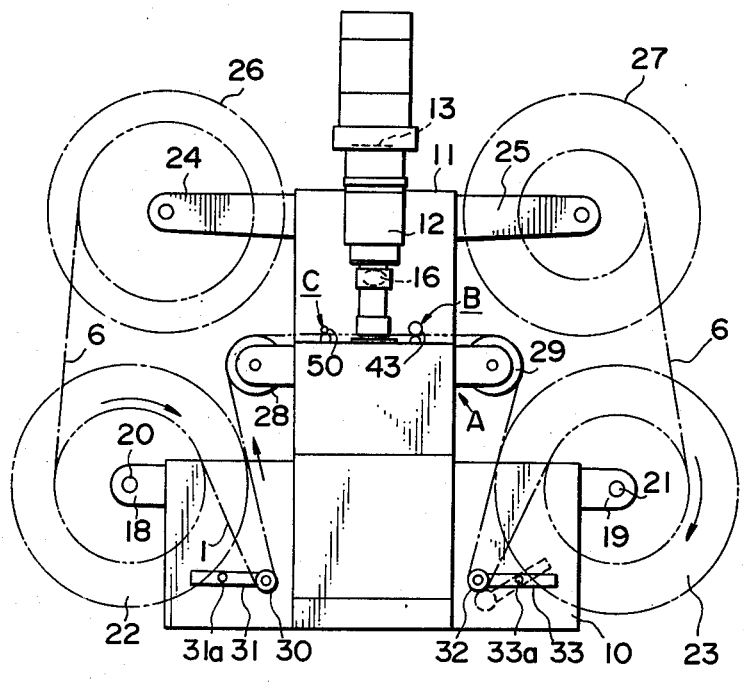
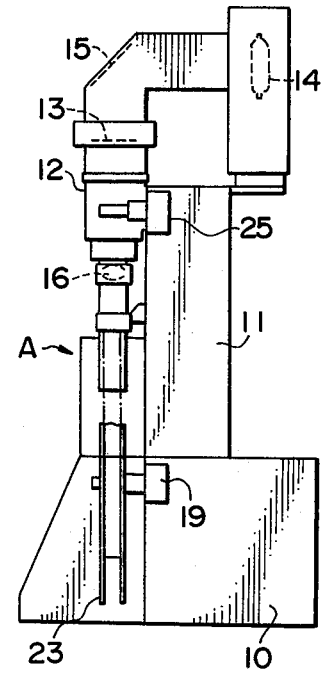

APPARATUS FOR EXPOSING A PHOTOSENSITIVE BELTLIKE MATERIAL

The present invention broadly relates to an exposing apparatus and more particularly to an apparatus for intermittently exposing on a photosensitive beltlike material an image of a desired pattern with a predetermined pitch.

Although there have heretofore been provided various types of exposing apparatus for various purposes, the apparatus according to the present invention is proved to be extremely useful particularly when it is utilized for producing lead frames in the field of Integral Circuit devices. It has recently been widly recognized by those concerned with this field that it is more advantageous in many aspects to produce lead frames on a beltlike material by utilizing photoetching techniques rather than to form lead frames individually by embossing technique or the like, because a continuous supply of lead frames having a desired contour can be more easily achieved.

Such a method for producing lead frames on a beltlike material through photoetching processes may mostly be carried out in such a manner that a desired pattern of a lead frame is first exposed on a beltlike material on which a thin photoresistcoated metallic foil is laminated, and then this material is put through an etching stage after undergong a developing process. As is well known, this photoresist is of such a nature that, when it is exposed to light, it gets to exhibit acid resistance. Accordingly, during the etching process, an unexposed portion of the beltlike material and the photoresist on that portion is dissolved: while an exposed portion remains as a final product, namely a lead frame, due to acid resistance of the photoresist.

Lead frames thus produced are of very much practical use. For example, they may be utilized for automatically and easily positioning IC devices at required positions on a print substrate and connecting therebetween, or for constituting IC devices by connecting each terminal of an IC chip with lead chips of lead frames.

Therefore, the present invention is to provide an apparatus for exposing an image of a desired pattern such as a lead frame pattern with a predetermined pitch on a beltlike material for such use as mentioned above, on which a thin photoresist-coated metallic foil is laminated. One of the most outstanding characteristics of the exposing apparatus according to the invention can be seen in that are provided a first means for supporting a beltlike material and positioning it at a right position, a second means for conveying said material and the third means for photoelectrically detecting the amount of its movement to control said first and second means.

In order that the above and other features of the invention may be better understood, one example will now be described in further detail with reference to the accompanying drawings, in which;

FIG. 1 is a perspective view of a photosensitive beltlike material adapted for the exposing apparatus of the invention.

FIG. 2 is a perspective view of a spacer.

FIG. 3 shows the beltlike material and the spacer both of which are overlapping wound around the reel.

FIG. 4 is a schematical front view of one embodiment of the apparatus.

FIG. 5 is a schematical side view of the apparatus shown in FIG. 4.

Figure 6:
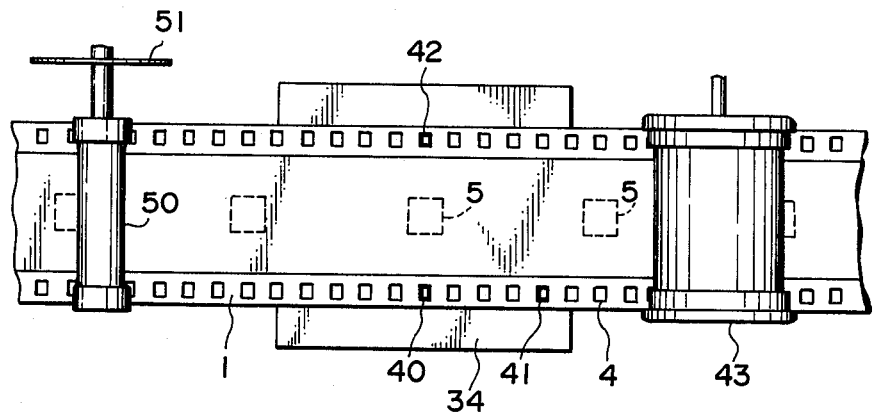
FIG. 6 is schematical front view of the feeding and positioning means.

First referring to FIG. 1, there is shown one embodiment of a photosensitive beltlike material 1 comprising of a plastic carrier 2 and a thin copper foil 3 laminated on the carrier 2. Perforations 4 for feeding the material 1, similar to those seen in a conventional 35 mm film, are made on both sides of the plastic carrier 2, which width is substantially greater than the copper foil 3.

Along the center line of the carrier 2, there are provided a series of so-called device holes 5 with a pitch which is predetermined to be always an interger multiple of the pitch of the perforations 4. It is required, prior to setting up the beltlike material 1 in the exposing apparatus, to coat the photoresist on the copper foil for the purpose of carrying out photoetching process.

As will be explained in more detail, the beltlike material 1, wound around a wind-off reel fixed to the apparatus of the invention, is fed onto an exposing postion from the wind-off reel, thereafter being wound up on take-up reel. According to the invention, a belt-shaped spacer 6 shown in FIG. 2 is employed so as to protect the surface of the copper foil 3 which otherwise would be damaged while being wound up by those reels.

The belt-shaped spacer 6 is of the same width as the plastic carrier 2 and is made of a flexible material. Arranged with a suitable pitch along both edges of the spacer 6 are a plurality of protrudences 7. A distance between the two opposite rows of protrudences 7 is greater than the width of the copper foil 3. Accordingly, when the beltlike material 1 and the spacer 6 both are wound on the reel with the protrudences 7 facing the copper foil 3 of the material 1, it will be understood from FIGS. 2 and 3 that each protrudence 7 contacts a non-copper foil area adjacent to the side edge of the plastic carrier 2 so as to protect the copper foil surface.

Referring now to FIGS. 4 and 5, wherein the exposing apparatus of the invention is illustrated, vertically mounted on a rigid base 10 is a metallic supporter 11 on which front portion a lens mount 12 is also vertically mounted. This lens mount 12 is adapted to arrange therein an original pattern block 13, reflection mirror 15, an optical lens 16 and some other optical units such as focal control means, lens stop control means, a control shutter for exposure time, etc., all of which have been conventionally used in the optical techniques. A light from a light source like a mercury vapor lamp 14 at the upper rear of the lens mount 12 is reflected at the reflection mirror 15 and then impinges upon the original pattern block 13. An image on the block 13 is thus focused by lens 16 onto the beltlike material 1.

As can be seen in FIGS. 4 and 5, a device for feeding and positioning the material 1 is provided under the bottom portion of lens mount 12. This device will be described in detail hereinafter.

On both sides of the base 10, there are symmetrically disposed laterally extending arms 18 and 19 having spindles 20 and 21. A wind-off reel 22 is rotatably supported on that spindle 20, while a take-up reel 23 is on the other 21. Further, another symmetrical pair of arms 24 and 25 are laterally disposed for rotatably supporting a spacer take-up reel 26 and a spacer wind-off reel 27 respectively. There are also provided a pair of guide rollers 28 and 29 on both sides of the feeding-positioning device, and a pair of dancer rollers 30 and 32 on the front portion of the base 10. Each dancer roller 30 or 32 is rotatably supported on one end of a swing-arm 31 or 33 pivotally mounted on the base 10.

The unexposed beltlike material 1 and the spacer 6 prior to the operation of the apparatus have already been set up around the wind-off reel 22, while another belt of spacer 6' has similarly been on the spacer wind-off reel 27.

As is shown by a two-dotted line, the material 1 unwound from the reel 22 is again wound up on the take-up reel 23 equipped with suitable driving means after passing between the feeding-positioning device and the bottom portion of lens mount 12 via dancer roller 30 and guide roller 28 and further travelling around another guide roller 29 and dancer roller 32. The spacer 6 which is wound off the reel 22 together with the material 1 is directly taken up on the spacer take-up reel 26 driven by suitable driving means.

On the other hand, wound up around the take-up reel 23 are the beltlike material 1 and another belt of spacer 6' unwound from the spacer wind-off reel 27. As mentioned before, two take-up reels 23 and 26 are provided with suitable driving means to tightly wind the beltlike material and the spacer 6 therearound. Meanwhile, it is preferable to equip two wind-off reels 22 and 27 with suitable braking means in order to prevent slackenings or saggings of the material 1 and the spacer 6 during conveyances.

Figure 7:
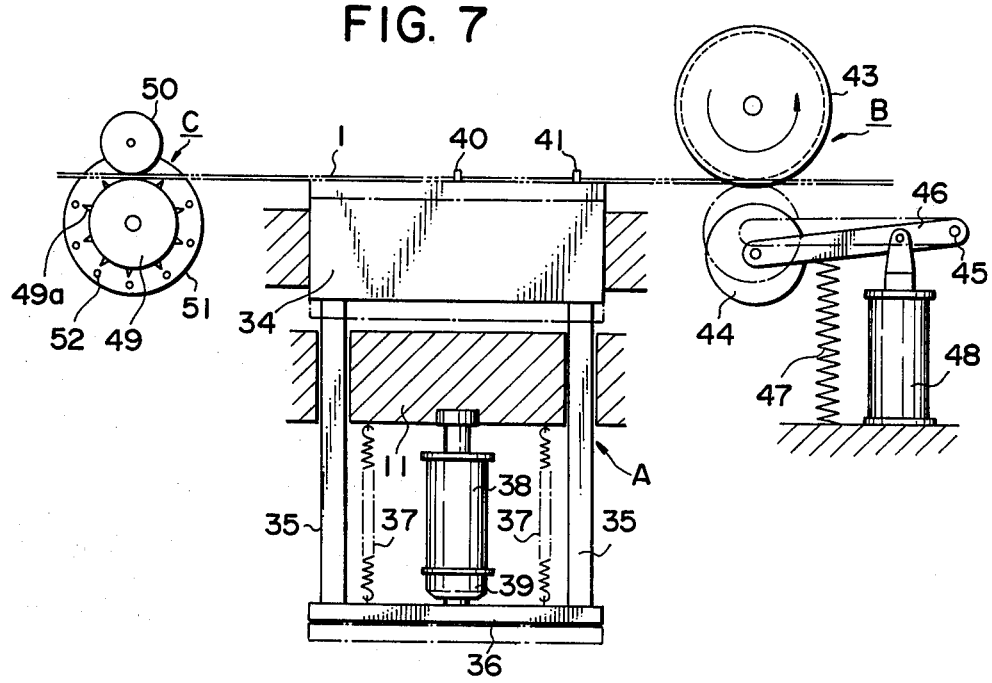
FIG. 7 is a front view of the feeding and positioning means shown in FIG. 6.

Attention is now directed to FIGS. 6 and 7 which illustrate in greater detail the feeding-positioning device to be located immediately below the bottom portion of lens mount 12.

As can best be seen in FIG. 7, this device basically comprises a vertically movable assembly A for supporting and positioning, feeding means B equipped with a driving motor and detecting means C for photoelectrically determining how much the beltlike material 1 is conveyed.

First, the assembly A, comprised of a pressure plate 34, two vertical guiding rods 35 and a horizontal bar 36, is suspended by two springs 37; normally hanging down to a position shown by a one-dotted line. However, once a solenoid 38 mounted on the supporter 11 is electrically excited, an iron core 39 vertically disposed on the bar is drawn to the solenoid 38. Thus, the assembly A moves up as a whole to press the beltlike material 1 placed on the upper surface of the pressure plate 34 against the bottom opening of lens mount 12.

In this instance, a plurality of positional pins 40 to 42 — only three are typically shown in FIG. 6 — disposed on the upper surface of the plate 34 fit into perforations 4 of the plastic carrier 2, thereby positioning the material 1. In this positioning operation, what is the most important is that the material 1 must be positioned by those pins 40 to 42 at a position where device holes 5 of the material 1 are accurately aligned with an optical axis of lens mount 12. Therefore, it naturally becomes necessary to employ suitable means for selecting the most appropriate one from a plurality of perforations 4 which each pin 40 to 42 should engage with. The present invention is employing photoelectrical detecting means for this purpose, which will be described later.

Feeding means B, located downstream of the travelling path of the material 1, substantially comprises a driving roller 43 having centrally-indented portion to keep itself away from the contact with the copper foil 3 and a pressure roller 44 mounted on one end of a lever 46 capable of pivotal movements at 45. Although the pressure roller 44 is normally urged against the underface of the beltlike material 1 by a compression spring 47 working upon the lever 46, it is made to separate from the material 1 as soon as a slenoid 48 is excited.

Detecting means C, located upstream of the travelling path of the material 1, comprises a pawl roller 49, a pressure roller 50, an apertured disc 51 and photoelectrical elements (not shown). The pawl roller 49, rotatably mounted in a constant contact with the underface of the material 1, is subject to the movement of the material 1 with its pawls 49a engaging with the perforations 4 of the material 1 one after another. In the meantime, the pressure roller 50, facing the above pawl roller 49 through the beltlike material 1, serves to facilitate positive engagements of pawls 49a with perforations 4.

The apertured disc 51, coaxial with the pawl roller 49, has a plurality of apertures 52 equidistantly disposed along its periphery. An angle between the two adjacent apertures 52 is made equal to that between the two adjacent pawls 49a. Further, there are disposed a light source and a photocell (not shown in drawings) on both sides of the apertured disc. 51. It will therefore be understood that each time the beltlike material 1 is conveyed an output pulse corresponding to each pitch of the perforations 4 is generated by the photocell.

As mentioned before, since the pitch of device holes 5 has previously been determined to be an interger mulitple of that of perforations 4, it becomes possible to control the feeding means B by the calculation of the output pulses from the photocell so as to convey the material 1 intermittently by a distance equal to one pitch of the device holes 5.

With the foregoing in mind, a typical operation of the above-described exposing apparatus representing one preferred embodiment of the invention will be carried out as described hereinafter and then the essential purposes and operational characteristics of the invention will be made more apparent.

To begin with, the beltlike material 1 and two belts of spacers 6(6') are set up around the respective reels as shown in FIG. 4. Then, the original pattern block 13 is placed at its prescribed position within lens mount 12 and the optical system such as lens 16 is appropriately adjusted to have an image of a desired size produced on the focal plane.

The beltlike material 1 is suitably positioned so that one of the device holes 5 is in an accurate alignment with an optical axis of the optical system prior to the electrical turn-on of the apparatus which causes an electrical excitation of the solenoid 38 and 48. The excitation of the solenoid 38 brings about the rising of the positioning assembly A. The positional pins 40 to 42 on the upper surface of the assembly A engage with the perforations 4, thereby maintaining an accurate alignment of the device hole with the optical axis as well as pressing the material 1 against the bottom portion of lens mount 12.

Meanwhile, the above electrical turn-on simultaneously excites another solenoid 48; which makes the pressure roller 44 separate from the underface fo the material 1. This separation of the roller 44 lends itself to more smooth engagement of pins 40 to 42 into perforations 4.

The exposing apparatus according to the invention is thus made ready to carry out the next process, namely the casting and the exposing of an image on the original pattern block 13 onto the beltlike material 1 which is now accurately positioned and tightly held between the bottom opening of lens mount 12 and the pressure plate 34. After a prescribed exposure time, a shutter is closed and the solenoid 38 is electrically disconnected; due to which positional pins 40 to 42 on the pressure plate 34 disengage from the perforations 4 and the material 1 is now made free enough to be conveyed. At the same time, the magnetic field being generated by another solenoid 48 dies out and the pressure roller 44 is to be urged upward by the spring 47 so that the material 1 is again tightly held between the two rollers 43 and 44.

After finishing the first exposing procedure in this way, the beltlike material 1 is conveyed by the driving roller 43 which rotates in such a direction as shown in FIG. 7. In this instance, the pawls roller 49 is compelled to rotate by the frictional engagement with the beltlike material 1; so is the apertured disc 51. The light from the light source, passing through the apertures 52, is received by the photocell which generates output pulses, the number of which exactly corresponds to that of perforations 4 the pawl roller 49 has engaged with.

The driving roller 43 automatically stops rotating and two solenoids 38 and 48 are electrically excited as soon as the generated pulses are counted up to the predeterined number, which of course varies according to the pitch of the device holes 5 although it is 6 in the illustrated embodiment. Thus, it may be understood that the same exposing process may be successively repeated so that an image pattern (lead frame pattern) is intermittently and equidistantly exposed on the photosensitive beltlike material 1.

As has been described heretofore, the feeding and the positioning of the material 1 is carried out by the driving roller 43 and the positional pins 40 to 42. In this case, what is the most imperative to facilitate smooth and positive feeding and positioning by them is that the beltlike material 1 placed at an exposing position be given a sufficient versatility. However, the material 1 is very likely to be pulled by both the take-up reel 23 having a driving motor and the wind-off reel 22 having braking means, and therefore, the tensed material can not afford to have such a sufficient versatility.

The invention employs a pair of dancer rollers 30 and 32 in order to give a sufficient versatility to the beltlike material 1. They are rotatably supported on the respective ends of a pair of swing arms 31 and 33 which are pivotally mounted on pins 31a and 33a respectively on the front portion of the base 10; a gravity center of each swing arm being located on a point slightly distant from the pin 31a or 33a toward the roller 31 or 33. Therefore, one end of the swing arm 31 or 33 on which the roller 30 or 32 is supported tends to go downward. However, once a tension is applied to the material 1 by the two reels 22 and 23, those rollers 30 and 32 easily go upward to give a slight slack or a versatility to the beltlike material. It should thus be appreciated that there is no external force whatsoever applied to the material other than an extremely slight tension caused by the weight of dancer rollers 30 and 32, and that the material may be given a sufficient versatility for the smooth and positive feeding and positioning thereof.

Although a preferred embodiment of the invention has been described with reference to the accompanying drawings, it should be understood that the invention is not limited to the embodiment illustrated above, and that various modifications and changes can be made without departing from the spirit or the scope of the invention. For instance, it may be apparent for those skilled in the art that, in stead of solenoids, electric motors can be used with the same operational effect obtained.

What we claim is:

1. Apparatus for exposing an image onto a photosensitive beltlike material, said appartus comprising:
    a light source to illuminate an original pattern block,
    an optical system to cast and focus an image of said pattern block,
    exposure control means to control the focusing and the exposing of said optical system,
    conveying means to intermittently convey said beltlike material onto the focal plane of said optical system,
    detecting means, being subject to a lateral movement of said beltlike material, to detect its amount of movement, thereby controlling said conveying means,
    supporting means to support and position said beltlike material at said focal plane,
    first rotating member having both said beltlike material and a beltlike protecting means wound therearound in advance,
    a second rotating member,
    a third rotating member having another beltlike protecting means wound therearound in advance, and
    a fourth rotating member;
    said fourth rotating member being adapted to receive said beltlike protecting means wound off from the first member, and said second rotating member member being adapted to receive both said beltlike material from the first member and another beltlike protecting means from the third member.

2. Apparatus according to claim 1, further having at least one dancer roller on a travelling path of said beltlike material.

3. Apparatus according to claim 1, wherein said conveying means comprises a driving roller for conveying said beltlike material and a pressure roller, said pressure roller being controlled by an electric actuator and being adapted to press said beltlike material against said driving roller.

4. Apparatus according to claim 1, wherein said supporting means, being suspended by biasing means, substantially comprises an electric actuator and a vertical movable assembly including a pressing member and a plurality of protrubences on the upper surface of said pressing member, said pressing member being adapted to press said beltlike material against the bottom opening of said optical system and a plurality of said protrubences being engageable with perforations disposed on both sides of said beltlike material, when said vertically movable assembly is moved upward by said electric actuator.

5. Apparatus for exposing an image onto a photosensitive beltlike material, said apparatus comprising:
    a light source to illuminate an original pattern block,
    an optical system to cast and focus an image of said pattern block.
    exposure control means to control the focusing and the exposing of said optical system,
    conveying means to intermittently convey said beltlike material onto the focal plane of said optical system,
    detecting means, being subject to a lateral movement of said beltlike material, to detect its amount of movement, thereby controlling said conveying means, and supporting means to support and position said beltlike material at said focal plane, said detecting means substantially comprising a roller having a plurality of pawls on its periphery, a disc coaxial with said roller and having along its periphery a plurality of apertures in a corresponding relationship to said pawls, and photoelectrical elements disposed on both sides of said disc; said pawls being adapted to engage with the perforations of the beltlike material so that both said roller and the disc follow the movement of the beltlike material, and said photoelectrical elements being adapted to be intermittently actuated through said apertures of the disc so as to generate output pulses for controlling said electric actuator of the conveying means.

* * * * *